United States Patent Office 3,532,666
Patented Oct. 6, 1970

3,532,666
COMPOSITION FOR ELECTRICAL INSULATION
Frank C. Csaszar, Morris Plains, N.J., assignor, by mesne assignments, to The Dow Chemical Company, Midland, Mich., a corporation of Delaware
No Drawing. Filed Apr. 4, 1966, Ser. No. 539,617
Int. Cl. C08f 29/22, 45/04; B44d 1/42
U.S. Cl. 260—41                                     6 Claims

ABSTRACT OF THE DISCLOSURE

An electrical insulating composition, especially for extrusion onto wire, made up of two distinct chlorinated linear polyethylenes, in combination with conventional filler and curing agent. One chlorinated polyethylene ingredient is amorphous (major proportion) and the other has limited crystallinity of 3%–30%. The resulting composition surpasses the Underwriters' Laboratories standards for primary electrical-grade wire insulation.

---

This invention relates to plastic compositions and more particularly to compositions useful as insulation for electrical wire and conduits.

Plastic compositions useful for primary electrical grade wire insulation require in combination a number of specific properties including electrical resistance, good elongation, high tensile strength, flexibility, oil resistance, good aging resistance and ozone resistance. Heretofore, the rubber materials which have satisfied the requirements for primary electrical grade wire insulation have been the premium complex chemical polymer materials. The chlorinated polymers of ethylene are of interest because of their relatively low cost and good chemical resistance. Clearly, it would be desirable to utilize such chlorinated polyethylenes in providing a new low cost electrical grade wire insulation. However, during my experimentation I tried to produce a primary electrical grade wire insulation material from a number of chlorinated polyethylenes but found them to be totally deficient in satisfying the requisite combinatiton of properties for this purpose.

The principal object of the present invention is to provide a new low cost thermosetting composition useful as primary electrical grade insulation and based on chlorinated polyethylene. Other objects and advantages will be evident from the following description of the invention.

In accordance with the present invention it has been found that primary electrical grade wire insulation is provided by curing of a composition containing two specific co-vulcanizable chlorinated polyethylenes, said composition comprising: (1) 100 parts chlorinated polyethylenes composed of an intimate mixture of (A) about 60 to 90 parts by weight of an elastomeric chlorinated polymer of ethylene having a chlorine content between about 20–50% by weight, less than 1% crystallinity as measured by differential thermal analysis, and glass transition temperature ranging from minus 20° C.±15° C. for the 20–25% chlorine content chlorinated polyethylenes up to about 20° C.±10° C. for the 50% chlorine content chlorinated polymer; and (B) about 10 to 40 parts by weight of an elastomeric chlorinated polyethylene having a chlorine content between about 20–50% by weight, crystallinity between 3% to 30%, preferably 5 to 20%, as measured by differential thermal analysis, and glass transition temperature ranging from 15° C.±30° C. for the 20–25% chlorine content polyethylene up to about 46° C.±22° C. for the 50% chlorine content chlorinated polymer; each said chlorinated polymers of ethylene preferably having weight average molecular weight corresponding to an intrinsic viscosity between about 0.5 to 5.0 in o-dichlorobenzene at 100° C.; (2) between about 50 to 150 parts filler material; and (3) between about 2 to 15 parts by weight of a curing agent for co-vulcanization of said polyethylenes, preferably a peroxide curing agent. The composition provided by the present invention may be readily extruded onto wire or other electrical conductors and vulcanized in conventional apparatus to form high quality insulating coatings satisfying the rigid standards of the Society of Automotive Engineers and Underwriters' Laboratories for primary electrical grade wire insulation.

In providing a primary electrical grade wire insulation from chlorinated polyethylene it has been found essential to intimately admix and co-vulcanize two different elastomeric chlorinated polyethylenes of highly specific properties and derived from linear, high density, highly crystalline polyethylene. The Component A chlorinated polyethylene is an elastomeric material having less than 1% crystallinity, preferably 0%, as measured by differential thermal analysis. The crystallinity in the chlorinated polymers employed in the invention is essentially residual crystallinity of the unchlorinated polyethylene and is suitably determined by determining the ratio of the area under the differential thermal analysis peak for the chlorinated polyethylene to the area under the peak similarly obtained upon the unchlorinated polyethylene starting material. The Component A chlorinated polyethylene of less than 1% crystallinity is therefore characterized by substantially reduced or a substantial absence of residual polyethylene crystallinity by differential thermal analysis. The Component A also has characteristic glass transition temperature ranging from about minus 20° C.±15° C. for the 20–25% chlorine content chlorinated polyethylene up to about 20° C.±10° C. for the 50% chlorine content chlorinated polymer. The more preferred chlorinated polyethylene of 30–45% chlorine have glass transition temperatures ranging from about minus 22° C.±15° C. for the 30% chlorine content material up to about 0° C.±10° C. for the 45% chlorine content chlorinated polyethylene. The glass transition temperatures for the chlorinated polyethylenes ranging from 20–50% chlorine can be ascertained by plotting of the values given herein. The glass transition temperature itself is a second order transition temperature and can be determined by plotting stiffness modulus of the sample as a function of temperature, and can be defined as the temperature at which the stiffness modulus of the sample possesses a value of $1.45 \times 10^4$ p.s.i. or $10^9$ dynes/cm.$^2$. The determination may be made in accordance with ASTM Test D1053–61. The glass transition temperature of the chlorinated polyethylene reflects distribution of the chlorine on the basic polymer chain and also the degree of crystallinity and homogeneity. In terms of properties of the chlorinated polyethylene the glass transition temperature is that below which the chlorinated polyethylenes become stiff. Above the glass transition temperature the chlorinated polymers become more flexible and rubbery. The low glass transition of the Component A chlorinated polyethylene contributes, on covulcanization with the Component B chlorinated polymer, to the provision of an elastic material having the outstanding combination of properties of low temperature flexibility and flex life.

The Component B chlorinated polyethylene has limited crystallinity within the range of about 3% to 30% as measured by differential thermal analysis. On co-vulcanization with Component A, the Component B chlorinated polymer is particularly helpful in providing the desired properties of tensile strength and processing. In order to obtain a satisfactory binary system it is required that the Component B chlorinated polyethyene have a crystallinity of at least 3% as measured by differential thermal analysis. The chlorinated polyethylenes having a crystallinity exceeding 30% are unsatisfactory as deprecitating the properties of low temperature flex and processing. Particularly good results are obtained when the Component B chlorinated polymer has a crystallinity between about 5–20% as determined by differential thermal analysis. The crystallinity of the chlorinated polymer is essentially residual polyethylene crystallinity and is obtained by chlorination of a highly crystalline polyethylene having a crystallinity of at least about 70%, preferably between 75 to 90%. The Component B chlorinated polyethylene also has characteristic glass transition temperature depending upon chlorine content with the 20–25% chlorine content chlorinated polyethylene having a glass transition temperature of about 15° C.±30° C. ranging up to about 46° C.±220° C. for the 50% chlorine content polymer. The more preferred Component B chlorinated polyethylenes have a glass transition temperature ranging from about 15° C.±30° C. for the 30% chlorine content chlorinated polyethylene up to a glass transition temperature of about 33° C.±28° C. for the 45% chlorine content chlorinated polyethylene. Glass transition temperatures for the Component B chlorinated polyethylenes may be plotted from the values given above.

Both the Component A and Component B chlorinated polymers are elastomeric chlorinated polyethylenes derived by chlorination from linear, high density highly crystalline polyethylene. Each of the chlorinated polyethylenes should have a chlorine content between about 20–50% by total weight of the chlorinated polyethylene. The chlorinated polyethylenes combined for co-vulcanization may of course have different chlorine contents within the indicated 20–50% range. Preferably the two chlorinated polyethylenes employed in the composition to be co-vulcanized will vary by not more than about 15% by weight chlorine to assure optimum compatibility of the chlorinated polymers. The chlorinated polyethylenes are both derived by chlorination of a linear polymer of ethylene having a high density of at least 0.93, more usually about 0.935 to 0.985. The terms "linear" or "substantially linear" as used herein and the appended claims shall mean a polyethylene characterized by high density and at most only nominal short chain branching in the form of methyl groups, usually less than 10 methyl groups per 1000 carbon atoms in the molecule, more commonly, 0 to 5 methyl groups per 1000 carbon atoms. The polyethylene which is chlorinated to produce both the Component A and Component B chlorinated polymers is also a highly crystalline polyethylene having crystallinity of at least about 70%, preferably between 75% to 90%, as measured by infrared spectra analysis. In order to provide a primary electrical insulation from the chlorinated polyethylenes it is required that the less crystalline Component A chlorinated polyethylene represent the major portion of the chlorinated polyethylene mixture which is to be co-vulcanized. Hence, the Component A chlorinated polymer represents between about 60 to 90 parts per 100 parts of total chlorinated polyethylene while the Component B chlorinated polymer represents between about 10 to 40 parts by weight of total chlorinated polyethylene resin. Particularly good results are obtained when the Component A chlorinated polyethylene represents about 65 to 80 parts per 100 parts of resin and the Component B chlorinated polymer is correspondingly employed in an amount between 20 to 35 parts by weight.

Both chlorinated polyethylenes are also characterized by a weight average molecular weight corresponding to an intrinsic viscosity between about 0.5 to 5.0 in o-dichlorobenzene at 100° C., preferably an intrinsic viscosity betwen 0.8 to 2.0. Such chlorinated polyethylenes are produced from ethylene polymers having weight average molecular weight between about 50,000 to 400,000, more usually between 100,000 to 250,000. The Component A and Component B chlorinated polyethylenes are prepared by different specifically controlled chlorination processes. Both chlorinated polymers are preferably produced by chlorination of polyethylene in a heterogeneous medium. The Component A chlorinated polyethylene is most desirably produced by chlorination in aqueous slurry according to a process in which a polyethylene is slurried in about 20 times its weight in water and chlorinated at a temperature initially about 80–110° C. up to 115° C. until about 10% by weight chlorine is added to the polymer. Rate of introduction of chlorine is controlled and varies largely with the particular molecular weight of the starting polyethylene between about 0.05 to 0.5 lb. of chlorine per pound of polyethylene charged per hour. The rate of chlorine introduction is proportionally lower as the molecular weight of the starting polyethylene decreases. An additional amount of chlorine usually up to about at least 17%, is then added at a temperature of about 115° C. The amount of chlorine added to the ethylene polymer at a temperature of approximately 115° C. is largely dependent on the final chlorine content of the product and preferably is such that all but the last few percent are added at such temperature. The rate of chlorination is controlled and is again determined largely on the basis of the molecular weight of the starting polyethylene. The chlorination temperature is then increased above the crystalline melting point of the polyethylene or to a temperature between about 130–140° C. and the remaining chlorine added to the polymer.

The component B chlorinated polyethylene of desired 3–30% crystallinity and glass transition temperature is also preferably prepared in aqueous slurry under carefully controlled temperature and chlorine feed conditions. According to a particularly preferred process the chlorinated polymer is slurried in about 20 times its weight of water and chlorination conducted at a temperature between about 100° C. to 120° C. at an average chlorine feed rate between about 0.2 to 0.5 lb. of chlorine per lb. of polyethylene charged per hour. Chlorination time to produce the chlorinated polyethylene of 20–45% chlorine is usually between 3 to 5 hours. Sampling of the polyethylene charged is recommended from time to time to determine the progress of chlorination and adjustments which may be required to obtain a chlorinated product of desired crystallinity and glass transition temperature. In this particularly preferred procedure the chlorination is commenced at a temperature of about 95–105° C. and slowly increased, subject to sampling, to a temperature of about 120° C. at the termination of the chlorination. Chlorine feed rates are also preferably increased such that the initial rate is about 0.2 lb. of chlorine per lb. of polyethylene charged per hour, increasing to an average rate of about 0.3–0.5 lb. of chlorine by the end of the chlorination period. Generally the chlorination is conducted at the lower temperatures and chlorine rate until about 10–17% chlorine has been added to the polyethylene. Chlorination temperatures may then be slowly increased to 120° C. but provision is carefully made to avoid increasing the temperature substantially above 120° C. Pressure maintained during such chlorination is also considered in obtaining the chlorinated polyethylenes of desired crystallinity and glass transition temperature. It is generally preferred to conduct the chlorination at pressures regulated within the range of 35–85 p.s.i.

In make-up of the composition containing co-vulcanizable polyethylenes it has been found that particularly good results are obtained when the chlorinated polyethylenes are derived by chlorination of polyethylene having a molecular weight between about 50,000 to 400,000 and derived by a thermal degradation process from ultra-high molecular weight polyethylene produced in accordance with British Pat. 858,674 of Jan. 11, 1961 to Allied Chemical Corporation. By means of such degradation process, also described in said patent, the high molecular weight polyethylene is thermally degraded or depolymerized by heating of the polymer at temperatures of the order of about 350–400° C. in the absence of oxygen. If desired, shearing forces may be applied during the depolymerization. The polyethylene materials produced from the high molecular weight polymers by thermal depolymerization are substantially linear materials having molecular weight within the range of about 30,000 to 400,000, more usually between 40,000 to 200,000, and a density between about 0.935 to 0.985 gm./cm.$^3$. The ultra-high molecular weight polyethylene of British Pat. 858,674 is a crystalline, high density polyethylene which is prepared by gas phase polymerization of an anhydrous, oxygen-free ethylene over a porous frangible supported catalyst prepared from an inorganic compound of chromium and oxygen and an active metal alkyl. The catalyst support is prepared from silica. The polyethylenes produced thereby contain residue of the chromium silica-catalyst system dispersed throughout the polyethylene in an amount of at least about .001%, usually .001–.002%, by weight of the polyethylene. The chromium-silica catalyst material added during polymerization is retained in the polyethylene during chlorination and contributes to the characteristic properties of the chlorinated polyethylene employed in the elastomeric compositions produced therefrom. The ethylene polymers produced in accordance with the above-referred to British patent have a crystallinity of at least about 75%, usually between 75% to 85%, as measured by infrared spectra analysis (about 50–75% by differential thermal analysis), a density between 0.935 and 0.985 gram/cm.$^3$, and a weight molecular weight of at least 700,000 usually between about 1.0 million to 5.0 million, as calculated according to the method of P. S. Francis et al. from the viscosity of about a 0.05 to 0.1 gram per 100 cc. solution in Decalin at 135° C. using the equation:

$$n = 6.77 \times 10 - 4_M 0.67$$

where $n$ = intrinsic viscosity
$M$ = weight average molecular weight (J. Polymer Science, vol. 31, pp. 443–466, September 1958). The high molecular weight polyethylenes produced in accordance with Example 6 of the above-referred to British patent are linear materials which, however, may also be characterized by containing long chain linear polyethylene branches. These high molecular weight polyethylenes have a melt index less than 0.10 according to ASTM D1238–52T at 190° C. with a 2160 gram weight; tensile strength values of the order of about 5,000 p.s.i. according to ASTM D412–51T; ultimate elongation of at least 350 p.s.i., generally of the order of 370–470 p.s.i., according to ASTM D412–51T, and high impact strength of at least 15 ft.-lbs./in. of notch, usually between 15–25 ft.-lbs./in. notch, according to ASTM D256–54T (Izod).

The Component A chlorinated polyethylenes of desired crystallinity and glass transition temperature produced by chlorination from the thermally depolymerized polyethylenes are characterized by being insoluble at 25° C. in organic solvents such as the alcohols, acetones of which methyl and butyl alcohols are specific examples. Such chlorinated polyethylenes also have tensile strength values according to ASTM Test D638–58T (at drawing rate of 2 inches per minute) of at least about 1000 p.s.i. usually between about 1300 p.s.i. and about 2000 p.s.i., a true ultimate tensile strength according to ASTM Test D638–58T of at least about 1000 p.s.i., usually between 1300 p.s.i. to 2000 p.s.i., and an elongation according to ASTM Test D638–58T between about 400% to 800%, more usually between about 500% to 600%.

The Component B chlorinated polyethylenes of desired crystallinity and glass transition temperature produced by chlorination from the thermally depolymerized polyethylenes are characterized by being insoluble at 25° C. in organic solvents such as the alcohols of which methyl and butyl alcohols are specific examples. Such chlorinated polyethylenes also have tensile strength values according to ASTM Test D638–58T (at drawing rate of 2 inches per minute) of at least about 1000 p.s.i. usually between about 1300 p.s.i. and about 2000 p.s.i., a true ultimate tensile strength according to ASTM D638–58T of at least about 1000 p.s.i., usually between 1300 p.s.i. to 2000 p.s.i., and elongation according to ASTM D638–58T between 400% to 800%, more usually between 500% to 600%.

Primary electrical grade wire insulation is provided by co-vulcanization of a composition containing the Component A and Component B chlorinated polyethylenes. Curing agents and systems for the chlorinated polyethylenes are known materials. Particularly good results are obtained when chlorinated polyethylenes are vulcanized with a peroxide curing agent. Examples of suitable peroxides which may be employed in curing the chlorinated polyethylenes include benzoyl peroxide, dicumyl peroxide, di-tertiary butyl peroxide, diacyl peroxides, 2,5-bis(tertiary butyl peroxy 2,5-dimethyl) hexane. The preferred peroxide curing agents are dicumyl peroxide, bis(tertiary butyl peroxy 2,5-dimethyl) hexane. The chlorinated polyethylene may also be cured with the polyfunctional aromatic and aliphatic amines. The amines activate generally at lower temperatures than the peroxide agents and can be employed by virtue of the presence of the Component A chlorinted polyethylene which has been found to reduce processing temperature and permit such amines to be incorporated in the composition without undesirable pre-curing on the mill. Examples of the aliphatic polyfunctional amines include triamino-triethyl propane, hexamethylenediamine carbamate, triethylenetetramine, tetraethylene pentamine, hexamethylenediamine, 2-mercaptoimidazoline, hexamethylenetetramine and triethanolamine. Suitable polyfunctional aromatic amines include m-xylylene diamine, p-xylylene diamine, benzyl dimethylamine, o-hydroxybenzyl dimethylamine and m-phenylene diamine. The curing agent is employed in amount between about 2–15 parts, preferably 3–10 parts, per 100 total parts of chlorinated polyethylene. Minor amounts of sulfur or a compound containing a reactive sulfur group may be employed with the curing agent, particularly with the peroxide curing agents, as such material has been found not only to increase cure rate but also to produce vulcanized insulating compounds of very good properties. Examples of sulfur-containing compounds which may be employed include dipentamethylene thiuram tetrasulfide, benzothiazyl disulfide, and 2-mercaptobenothiazole. The sulfur or sulfur-containing compound is incorporated in an amount between about 0.1 to 1.0 part, preferably 0.1 to 0.5 part, per 100 total parts of chlorinated polyethylene. Hence, very good results are obtained when the chlorinated polyethylenes are co-vulcanized by a curing system comprising 3 to 10 parts of a peroxide and between about 0.1 to 0.5 part of sulfur per 100 parts of chlorinated polyethylene. Other compounds such as the oxides of the metals of Groups II and IV of the Periodic Table may also be employed to accelerate curing. Examples of preferred metal oxides include magnesium oxide, zinc oxide and lead oxide. The amount of metal oxide is generally between 0.5 to 5 parts, preferably between 1 to 4 parts, per 100 parts of chlorinated polyethylene.

The primary electrical grade wire insulating composition of the invention includes filler material in an amount between about 50–150 parts per 100 parts of chlorinated polyethylene, preferably between about 70 to 120 parts. Examples of suitable fillers include the carbon blacks, clay, mica, the carbonates such as magnesium and calcium carbonate, talc, silica and titanium dioxide. The more preferred fillers include clay, furnace blacks, silicas and clays.

In practice of the invention a composition suitable for extrusion onto wire as electrical grade insulation may be compounded using conventional apparatus such as a Banbury mixer or a two roll rubber mill. To facilitate processing of the composition it is generally desirable to add a processing aid or plasticizing material for the chlorinated polyethylene. Suitable plasticizing materials include the highly aromatic oils, the naphthenic oils, epoxidized oils such as epoxidized soya bean oil and the dibasic esters of alcohols having 4 to 16 carbon atoms and derived from acids such as phthalic, adipic and sebacic. Specific examples of such dibasic ester plasticizers include diisodecyl phthalate, 2-ethylhexyl phthalate, dibutyl phthalate, dioctyl phthalate, butyl benzyl phthalate, dioctyl adipate and dioctyl sebacate. The particularly preferred plasticizing materials are the highly aromatic oils and napthenic oils. The amount of plasticizing material employed ranges from about 10 parts up to about 40 parts, preferably 15–30 parts, per 100 parts of chlorinated polyethylene. It is particularly preferred that the composition for extrusion onto wire be compounded according to a procedure in which the plasticizing material be added to the chlorinated polyethylene at a temperature above about 180° F. but not in excess of about 300° F. According to such procedure the chlorinated polyethylene is charged to suitable compounding apparatus such as a Banbury mixer or rubber mill which has been preheated to 180°–240° F. Material which stabilizes the chlorinated polyethylenes against decomposition at elevated temperatures are added to the chlorinated polyethylene. The heat stabilizers conventionally employed with chlorine containing polymer resins are suitable. Examples of such stabilizers include the organic complexes and salts of metals such as barium, cadmium, tin, zinc, lead, sodium, and the like. Also particularly suitable are the liquid epoxy resins such as obtained from the reaction of epichlorohydrin and bisphenol-A. The usual stabilizing amounts of such materials are effective, for example, between about 1 to 10 parts of stabilizer per 100 parts of chlorinated polyethylene. The plasticizing material and usually some portion of the filler, for example, about 10 to 50 parts of filler per 100 parts of chlorinated polyethylene, are then added to the stabilized chlorinated polyethylenes and the resulting mass heated to a temperature above about 180° F., preferably between about 200–240° F. At such temperature the plasticizing material becomes homogeneously admixed with the preferred chlorinated polyethylenes in a very short period of time between about 1 to 10 minutes. The remaining portion of the filler material is then added and after mixing for about 1–5 minutes the temperature of the mass is reduced below about 240° F. for addition of the curing agent or curing system. Extrusion aids may also be incorporated in the composition in the usual small amounts ranging about 0.5 to 5 parts per 100 parts of chlorinated polyethylene. Suitable extrusion aids for chlorine containing polymers are well known and include by way of example, stearic acid, paraffin, stearates and low molecular weight polyethylene. After compounding the resulting composition may be sheeted out and divided into a size customarily employed for extrusion onto wire and apparatus suitable for such purpose. Extrusion temperatures employed with the composition are preferably within the range of about 200–275° F. The coating applied by extrusion to the wire may then be vulcanized by application of heat and pressure in conventional equipment such as a continuous steam vulcanizer. Vulcanization in the continuous steam vulcanizer usually takes place at temperatures between about 380° F. to 400° F. and under steam pressure between about 180 to 240 p.s.i.

The following examples in which parts and percentages are by weight demonstrate the practice and advantages of the present invention.

EXAMPLE 1

Two chlorinated polyethylenes were prepared by chlorination in aqueous slurry from linear high density highly crystallinity polyethylene. A Component A polyethylene of 40% chlorine, crystallinity of 0% as measured by differential thermal analysis and glass transition temperature of minus 15° C.±1° C. (ASTM D1053–61), was prepared by slurrying polyethylene of 150,000 weight average molecular weight in 20 times its weight of water and in an enclosed vessel with chlorination commenced at a temperature of 100° C. with chlorine being introduced into the slurry at a rate of about 0.2 lb. of chlorine per lb. of polyethylene per hour. The reaction temperature was slowly increased over the course of about 2 hours to a temperature of about 115° C. to add a total of about 10% chlorine to the polyethylene. Chlorination was then continued at 115° C. until the polymer had a chlorine content of about 25%, and then the temperature increased to 140° C. during which increase chlorination was continued such that a total of about 32% was aded to the polymer. Chlorination was then continued at a temperature of 140° C. until a total of 40% chlorine had been added to the polyethylene. The resulting slurry was filtered and the chlorinated polyethylene product was washed and dried at a temperature of about 60° C. for 24 hours. The Component A chlorinated polyethylene had weight average molecular weight coresponding to an intrinsic viscosity of about 2.1 as measured in o-dichlorobenzene at 100° C. A Component B chlorinated polyethylene of 37% chlorine, 8% crystallinity by differential thermal analysis, and glass transition temperature of plus 23° C.±1° C., was prepared from a polyetheylene of about 100,000 weight average molecular weight by suspending the polyethylene in about 20 times its weight of water in an enclosed vessel and chlorinating in such aqueous slurry at a temperature initially of about 100° C. increasing to about 120°C. at termination of such chlorination. Total time for the chlorination was about 3–5 hours with the average feed rate of chlorine being about 0.2–0.4 lb. of chlorine per lb. polyethylene charged per hour. The initial chlorine feed rate was about 0.2 lb. chlorine per lb. polyethylene per hour increasing at 100° C. to a feed rate of 0.3–0.4 lb. chlorine, and completed at a rate of 0.4 lb. chlorine. During chlorination the pressure was about 60 p.s.i. The Component B chlorinated polyethylene had weight average molecular weight corresponding to an intrinsic viscosity of 0.8 in o-dichlorobenzene at 100° C. Both the Component A and Component B chlorinated polyethylenes were prepared from a polyethylene which was derived by thermal depolymerization of a 1.5 million weight average molecular weight polyethylene prepared by gas phase polymerization of anhydrous oxygen-free ethylene over a catalyst of magnesium dichromate on a porous support with an aluminum triisobutyl. The support was composed of silica. The polyethylene contained about 0.0015% by weight residue of the chromium-silica catalyst dispersed throghout the polyethylene. The thermally depolymerized polyethylene and high molecular weight polyethylene were prepared in accordance with British Pat. 858,674 (Example 6). A mixture composed of 70 parts of the Component A chlorinated polyethylene and 30 parts of the Component B chlorinated polyethylene was charged to a Banbury mixer Model No. B. The Banbury was heated to about 180° F. by means of steam and the chlorinated polyethylene mixture was heated to about 180° F. after mixing on the Banbury for about 1 minute. There was then added about 8 parts of an epoxy stabilizer comprising the reaction product of bisphenol-A and epichlorohydrin and obtained under the trademark "Epon" 828. The stabilizer was admixed for about ½ minute. There was added about 50 parts of calcium silicate and about 15 parts of a highly aromatic oil obtained under the trademark "Philrich" 5. The resulting mass was mixed in the Banbury for about 6 minutes during which the temperature of the mass increased to about 200–220° F. and a homogeneous composition formed. There was also incorporated about 1 part of stearic acid as extrusion aid. There was then added an additional 50 parts of calcium silicate which was admixed with the composition on the Banbury at a temperature of 210–240° F. over the course of about 2 minutes. tI was noted that the mixture containing both Component A and B chlorinated polyethylenes had the desirable characteristics of processing at lower temperatures than similarly composed compositions containing just the Component B resin. Temperature of the resulting mass was then reduced to about 210° F. by cooling with water. There was then added to the composition about 7 parts dicumyl peroxide which was admixed over the course of about 2 minutes at a temuerature of 200–210° F. The resulting composition was then sheeted out at a temperature of about 200° F. on a two roll rubber mill. The sheeted out composition was cut into strips and fed to a 2 inch extruder and extruded at a temperature of about 250–260° F. onto 14S copper wire. The composition coated wire was subjected to curing in a continuous steam vulcanizer at temperatures of the order of about 200° C. and steam pressure of about 225 p.s.i. Cure time in the continuous steam vulcanizer was about 1 minute. Samples of the cured insulation were obtained by cutting from the wire. Additional specimens were obtained from the composition sheeted out on the two roll mill by curing in a mold press at temperatures of about 160° C .and at pressure of about 80 p.s.i. Cure time in the mold press was about 30 minutes. Samples of the cured insulation cut from the wire and the mold pressed specimens were subjected to testing and the results summarized below in Table 1. In Table 1 the values obtained for the composition of the invention are listed in Column A for comparison with Column B which gives the required specifications for primary electrical grade wire insulation according to the standards of Underwriters' Laboratories.

TABLE 1

| Physical properties | Column A | Column B |
| --- | --- | --- |
| Tensile strength, p.s.i | 2,400 | 2,000 min. |
| Elongation, percent | 275 | 225 min. |
| Hardness, Shore A | 78 | 75±5. |
| Embrittlement temperature, ° C. (ASTM D 832-46T) | −40° F | −20° F. |
| Electrical properties, dielectric strength, volts/mil | 750 | 500. |
| Ozone resistance (unfilled) (0.24% ozone, 50% extension) (modified ASTM D 599-40T) | No cracks | No cracks. |
| Heat resistance (unfilled) (5 days at 100° C., air-oven) | | |
| Tensile strength change | −5 | Max.±25%. |
| Elongation, percent original/final | −20 | Max.±50%. |
| Hardness change | +7 | Max.±10%. |

EXAMPLE 2

Two chlorinated polyethylenes were prepared by chlorination in aqueous slurry from linear high density highly crystallinity polyethylene. A Component A polyethylene of 40% chlorine, crystallinity of 0% as measured by differential thermal analysis and glass transition temperature of minus 15° C.±1° C. (ASTM D1053-61), was prepared by slurrying polyethylene of 150,000–200,000 weight average molecular weight in 20 times its weight of water in an enclosed vessel with chlorination commenced at a temperature of 100° C. with chlorine being introduced into the slurry at a rate of about 0.2 lb. of chlorine per lb. of polyethylene per hour. The reaction temperature was slowly increased over the course of about 2 hours to a temperature of about 115° C. to add a total of about 10% chlorine to the polyethylene. Chlorination was then continued at 115° C. until the polymer had a chlorine content of about 25%, and then the temperature increased to 140° C. during which increase chlorination was continued such that a total of 32% was aded to the polymer. Chlorination was then continued at a temperature of 140° C. until a total of 40% chlorine had been added to the polyethylene. The resulting slurry was filtered and the chlorinated polyethylene product was washed and dried at a temperature of about 60° C. for 24 hours. The Component A chlorinated polyethylene had weight average molecular weight corresponding to an intrinsic viscosity of about 2.1 as measured in o-dichlorobenzene at 100° C. A Component B chlorinated polyethylene of 37% chlorine, 8% crystallinity by differential thermal analysis, and glass transition temperature of +23° C.±1° C., was prepared from a polyethylene of about 100,000 weight average molecular weight by suspending the polyethylene in about 20 times its weight of water in an enclosed vessel and chlorinating in such aqueous slurry at a temperature initially of about 100° C. increasing to about 120° C. at termination of such chlorination. Total time for the chlorination was about 3–5 hours with the average feed rate of chlorine being about 0.2–0.4 lb. of chlorine per lb. polyethylene charged per hour. The initial chlorine feed rate was about 0.2 lb. chlorine per lb. polyethylene per hour increasing at 100° C. to a feed rate of 0.3–0.4 lb. chlorine, and completed at a rate of 0.4 lb. chlorine. During chlorination the pressure was about 60 p.s.i. The Component B chlorinated polyethylene had weight average molecular weight corresponding to an intrinsic viscosity of 0.8 in o-dichlorobenzene at 100° C. Both the Component A and Component B chlorinated polyethylenes were prepared from a polyethylene which was derived by thermal depolymerization of a 1.5 million weight average molecular weight polyethylene prepared by gas phase polymerization of anhydrous oxygen-free ethylene over a catalyst of magnesium dichromate on a porous support with an aluminum triisobutyl. The support was composed of silica. The polyethylene contained about 0.0015% by weight residue of the chromium-silica catalyst dispersed throughout the polyethylene. The thermally depolymerized polyethylene and high molecular weight polyethylene were prepared in accordance with British Pat. 858,674 (Example 6). A mixture composed of 70 parts of the Component A chlorinated polyethylene and 30 parts of the Component B chlorinated polyethylene was charged to a Banbury mixer Model No. B. The rotating mixing drums of the Banbury were heated to about 180° F. by means of steam and the chlorinated polyethylene mixture was heated to a temperature of about 180° F. after mixing on the Banbury for about 1 minute. There was then added to the mixture about 8 parts of an epoxy stabilizer comprising the reaction product of bisphenol-A and epichlorohydrin and obtained under the trademark "Epon" 828. The stabilizer was admixed on the Banbury with the chlorinated polyethylenes for about ½ minute. There was added about 50 parts of calcium silicate and about 15 parts of a highly aromatic oil obtained under the trademark "Philrich" 5. The resulting mass was mixed in the Banbury for about 6 minutes during which the temperature of the mass increased to about 200–230° F. and a homogeneous composition formed. There was also incorporated in the composition about 1 part of stearic acid as extrusion aid. There was then added an additional 50 parts of calcium silicate which was admixed with the composition on the Banbury at a temperature of about 200–240° F. over the course of about 2 minutes. Temperature of the resulting mass was then reduced to 210±10° F. by cooling with water. There was then added to the composition 0.3 part sulfur and about 7 parts dicumyl peroxide which was admixed over the course of about 2 minutes at a temperature of 215±10° F. The resulting composition was then sheeted out at a temperature of about 100° C. on a two roll rubber mill. The sheeted out composition was cut into strips and fed to a 2 inch Royal extruder, and extruded at a temperature of about 250–260° F. onto 14S copper wire. The composition coated wire was subjected to curing in a continuous steam vulcanizer at temperatures of the order of about 200° C. and steam pressure of about 225 p.s.i. Cure time in the continuous steam vulcanizer was about 1 minute. Samples of the cured insulation were obtained by cutting from the wire. Additional specimens were obtained from the composition sheeted out on the two roll by curing in a mold press at temperatures of about 160° C. and at pressure of about 80 p.s.i. Cure time in the mold press was about 30 minutes. Samples of the cured insulation cut from the wire and the mold pressed specimens were subjected to testing and the results summarized below in Table 2. In Table 2 the values obtained for the composition of the invention are listed in Column A for comparison with Column B which gives the required specifications for primary electrical grade wire insulation according to the standards of Underwriters' Laboratories.

TABLE 2

| Physical properties | Column A | Column B |
| --- | --- | --- |
| Tensile strength, p.s.i. | 2,250 | 2,000 min. |
| Elongation, percent | 325 | 225. |
| Hardness, Shore A | 80 | 75±5. |
| Embrittlement temperature.°C. (ASTM D 832-46T) | −40° F. | −20° F. |
| Electrical properties, dielectric strength volts/mil | 780 | 500 min. |
| Ozone resistance (unfilled) (∂, 24% ozone. 50% extension) (modified ASTM D 599-40T) | No cracks | No cracks. |
| Heat resistance (unfilled), (7 days at 150° C., air-oven) | | |
| Tensile strength original/final, p.s.i. | −6 | Max.−25%. |
| Elongation, percent original/final | −18 | Max.−50%. |
| Hardness change | +8 | 0 to +10. |

It is well known in the art of characterizing macromolecular resins to calculate a molecular weight figure from the figure determined for intrinsic viscosity of the resin. The molecular weight figures thus calculated depend, of course, upon the particular formula used for the calculation and accordingly should be regarded as approximate rather than exact. They represent approximate weight average molecular weights.

Intrinsic viscosity, as the term is used herein, is defined as the limit, at infinite dilution, of specific viscosity $(N_{sp})$ divided by concentration (C) expressed in grams of resin per deciliter of solution. Specific viscosity is measured as: $(t-t_0)/t_0$, where $t$ is the effluent time for a given quantity of polymer solution from a standard pipet and $t_0$ is the effluent time for an equal quantity of the pure solvent. Intrinsic viscosity can be determined, accordingly, by plotting $(N_{sp}/C)$ against C, at low concentrations, and extrapolating the resulting curve to 0 concentration.

The intrinsic viscosities reported herein are determined in accordance with ASTM Test D1601–61, the units thereof being deciliters per gram. Intrinsic viscosities of the polymers of this invention herein reported are in orthodichlorobenzene solvent at 100° C., and for ethylene polymers herein the intrinsic viscosities are in Decalin solvent at 135° C.

The densities of polymers reported herein are determined by ASTM Test D792–60T at 23° C. and are in units of grams per milliliter.

Crystallinity, as used in reference to the chlorinated polyethylene employed in this invention, is residual crystallinity of the unchlorinated polyethylene starting material retained in the chlorinated polymer as determined by differential thermal analysis of the chlorinated polyethylene and is suitably measured by determining the ratio of the area under the differential thermal analysis peak for the chlorinated polymer to the area under the peak similarly obtained upon the unchlorinated polyethylene starting material (the measurements of the differential thermal analysis peaks being made at the melting temperature of the polyethylene starting material).

Although certain preferred embodiments of the invention have been disclosed for purpose of illustration, it will be evident that various changes and modifications may be made therein without departing from the scope and spirit of the invention.

I claim:
1. In the method of insulating electrical wire and conduits comprising extruding and curing thereon a composition comprising chlorinated polyethylene, filler and curing agent: the improvement wherein the chlorinated polyethylene is a mixture of (A) about 60 to 90 parts by weight of an elastomeric chlorinated linear polymer of ethylene having a chlorine content between about 20%–50% by weight, less than 1% crystallinity as measured by differential thermal analysis, and glass transition temperature ranging from minus 20° C.±15° C., for the 20%–25% chlorine content chlorinated polymers up to about 20° C.±10° C. for the 50% chlorine content chlorinated polymers; and (B) about 10 to 40 parts by weight of an elastomeric chlorinated linear polymer of ethylene having a chlorine content between about 20%–50% by weight, crystallinity between 3% to 30%, as measured by differential thermal analysis, and glass transition temperature ranging from 15° C.±30° C. for the 20%–25% chlorine content chlorinated polymers up to about 46° C.±22° C. for the 50% chlorine content chlorinated polymers.

2. The method according to claim 1 in which the composition comprises: (1) the said chlorinated polymers (A) and (B) in combined amount of 100 parts by weight, said chlorinated polymer (A) having a chlorine content between about 30%–45% by weight, less than 1% crystallinity as measured by differential thermal analysis, and glass transition temperature ranging from minus 22° C.±15° C. for the 30% chlorine content chlorinated polymers up to about 0° C.±10° C. for the 45% chlorine content chlorinated polymers, and said chlorinated polymer (B) having a chlorine content between about 30%–45% by weight, crystallinity between about 5% to 20%, as measured by differential thermal analysis, and glass transition temperature ranging from 15° C.±30° C. for the 30% chlorine content chlorinated polymers up to about 33° C.±28° C. for the 45% chlorine content chlorinated polymers; each said chlorinated polymers of ethylene having weight average molecular weight corresponding to an intrinsic viscosity between about 0.8 to 2.0 deciliters per gram in o-dichlorobenzene at 100° C.; (2) between about 50 to 150 parts filler material; and (3) between about 2 to 15 parts by weight of peroxide curing agent for co-vulcanization of said chlorinated polymers.

3. Improved insulated electrical wire having thereon as insulation the vulcanizate of a composition comprising chlorinated polyethylene, filler and curing agent wherein the improvement comprises chlorinated polyethylene composed of a mixture of (A) about 60 to 90 parts by weight of an elastomeric chlorinated linear polymer of ethylene having a chlorine content between about 20%–50% by weight, less than 1% crystallinity as measured by differential thermal analysis, and glass transition temperature ranging from minus 20° C.±15° C. for the 20%–25% chlorine content chlorinated polymers up to about 20° C.±10° C. for the 50% chlorine content chlorinated polymers; and (B) about 10 to 40 parts by weight of an elastomeric chlorinated linear polymer of ethylene having a chlorine content between about 20%–50% by weight, crystallinity between 3% to 30%, as measured by differential thermal analysis, and glass transition temperature ranging from 15° C.±30° C. for the 20%–25% chlorine content chlorinated polymers up to about 46° C.±22° C. for the 50% chlorine content chlorinated polymers.

4. Insulated electrical wire according to claim 3 in which the vulcanizate comprises: (1) the said chlorinated polymers (A) and (B) in combined amount of 100 parts by weight, said chlorinated polymer (A) having a chlorine content between about 30%–45% by weight, less than 1% crystallinity as measured by differential thermal analysis, and glass transition temperature ranging from minus 22°

C.±15° C. for the 30% chlorine content chlorinated polymers up to about 0° C.±10°C. for the 45% chlorine content chlorinated polymers, and said chlorinated polymer (B) having a chlorine content between about 30%–45% by weight, crystallinity between about 5% to 20% as measured by differential thermal analysis, and glass transition temperature ranging from 15° C.±30° C. for the 30% chlorine content chlorinated polymers up to about 33° C.±28° C. for the 45% chlorine content chlorinated polymers; each said chlorinated polymers of ethylene having weight average molecular weight corresponding to an intrinsic viscosity between about 0.8 to 2.0 deciliters per gram in o-dichlorobenzene at 100° C.; (2) between about 50 to 150 parts filler material; and (3) between about 2 to 15 parts by weight of peroxide curing agent for co-vulcanization of said chlorinated polymers.

5. An improved curable composition suitable for primary electrical-grade wire insulation comprising chlorinated polyethylene, filler and curing agent wherein the improvement comprises chlorinated polyethylene composed of a mixture of (A) about 60 to 90 parts by weight of an elastomeric chlorinated polymer of ethylene having a chlorine content between about 20%–50% by weight, less than 1% crystallinity as measured by differential thermal analysis, and glass transition temperature ranging from minus 20° C.±15° C. for the 20%–25% chlorine content chlorinated polymers up to about 20° C.±10° C. for the 50% chlorine content chlorinated polymers; and (B) about 10 to 40 parts by weight of an elastomeric chlorinated polyethylene having a chlorine content between about 20%–50% by weight, crystallinity between about 3% to 30% as measured by differential thermal analysis, and glass transition temperature ranging from 15° C.±30° C. for the 20%–25% chlorine content chlorinated polymers up to about 46° C.±22° C. for the 50% chlorine content chlorinated polymers.

6. A curable composition according to claim 5 comprising: (1) the said chlorinated polymers (A) and (B) in combined amount of 100 parts by weight, said chlorinated polymer (A) having a chlorine content between about 30%–45% by weight, less than 1% crystallinity as measured by differential thermal analysis, and glass transition temperature ranging from minus 22° C.±15° C. for the 30% chlorine content chlorinated polymers up to about 0° C.±10° C. for the 45% chlorine content chlorinated polymers, and said chlorinated polymer (B) having a chlorine content between about 30%–45% by weight, crystallinity between about 5% to 20% as measured by differential thermal analysis, and glass transition temperature ranging from 15° C.±30° C. for the 30% chlorine content chlorinated polymers up to about 33° C.±28° C. for the 45% chlorine content chlorinated polymers; each said chlorinated polymers of ethylene having weight average molecular weight corresponding to an intrinsic viscosity between about 0.8 to 2.0 deciliters per gram in o-dichlorobenzene at 100° C.; (2) between about 50 to 150 parts filler material; and (3) between about 2 to 15 parts by weight of peroxide curing agent for co-vulcanization of said chlorinated polymers.

References Cited

UNITED STATES PATENTS

| | | | |
|---|---|---|---|
| 2,625,931 | 1/1953 | Phillips | 117—128.7 |
| 3,227,781 | 1/1966 | Klug et al. | |
| 3,244,774 | 5/1966 | Klaupp. | |
| 3,260,694 | 7/1966 | Wang. | |
| 3,409,706 | 11/1968 | Frey et al. | 260—897 |

MORRIS LIEBMAN, Primary Examiner

S. L. FOX, Assistant Examiner

U.S. Cl. X.R.

117—128.7; 260—897